June 16, 1959 J. S. PILCH 2,890,683
FLUID ACTUATED CONTROL VALVE MEANS FOR FLUID MOTORS
Original Filed Feb. 6, 1952 4 Sheets-Sheet 1

INVENTOR.
JOHN S. PILCH
BY
*Raymond A. Paquin*
ATTORNEY.

INVENTOR.
JOHN S. PILCH

INVENTOR.
JOHN S. PILCH
ATTORNEY.

United States Patent Office 2,890,683
Patented June 16, 1959

2,890,683
FLUID ACTUATED CONTROL VALVE MEANS FOR FLUID MOTORS

John S. Pilch, Ware, Mass.

Original application February 6, 1952, Serial No. 270,118, now Patent No. 2,807,379, dated September 24, 1957. Divided and this application October 5, 1954, Serial No. 460,388

6 Claims. (Cl. 121—38)

This invention relates to material handling devices such as loaders or the like and has specific reference to such devices which are hydraulically operated and to a new and improved hydraulic system therefor.

This application is a division of my application Serial No. 270,118, filed February 6, 1952, now Patent No. 2,807,379.

An object of the invention is to provide a material handling device of the type set forth wherein the speed of operation of the device is considerably increased while maintaining control of the device.

Another object of the invention is to provide a new and improved loader which is hydraulically operated and in which the speed of dumping of the loader bucket has been considerably increased while maintaining control over the movement of the bucket.

Another object of the invention is to provide a new and improved hydraulically operated apparatus in which the operation of the device is considerably speeded up while allowing the operator to maintain full control of such operation.

Another object of the invention is to set forth a new and improved hydraulic system for use in apparatus of the type set forth.

Another object of the invention is to provide a new and improved flow control valve for a hydraulic system.

Another object is to provide a new and improved bypass or flow control arrangement for hydraulic systems and a new and improved hydraulic system embodying the same.

Another object is to provide a new and improved fluid reservoir arrangement for material handling apparatus.

Other objects and advantages of the invention will be apparent from the following description taken in connection with the accompanying drawings and it will be understood that changes may be made in the details of construction and arrangement of parts without departing from the scope of the invention, as set forth in the accompanying claims, as the preferred form of the invention has been given by way of illustration only.

While, for the purpose of illustration the present invention has been shown and described as applied to a loader, it will be understood that the features thereof are also capable of application and utilization in other forms of material handling apparatus.

Referring to the drawings.

Figure 1:
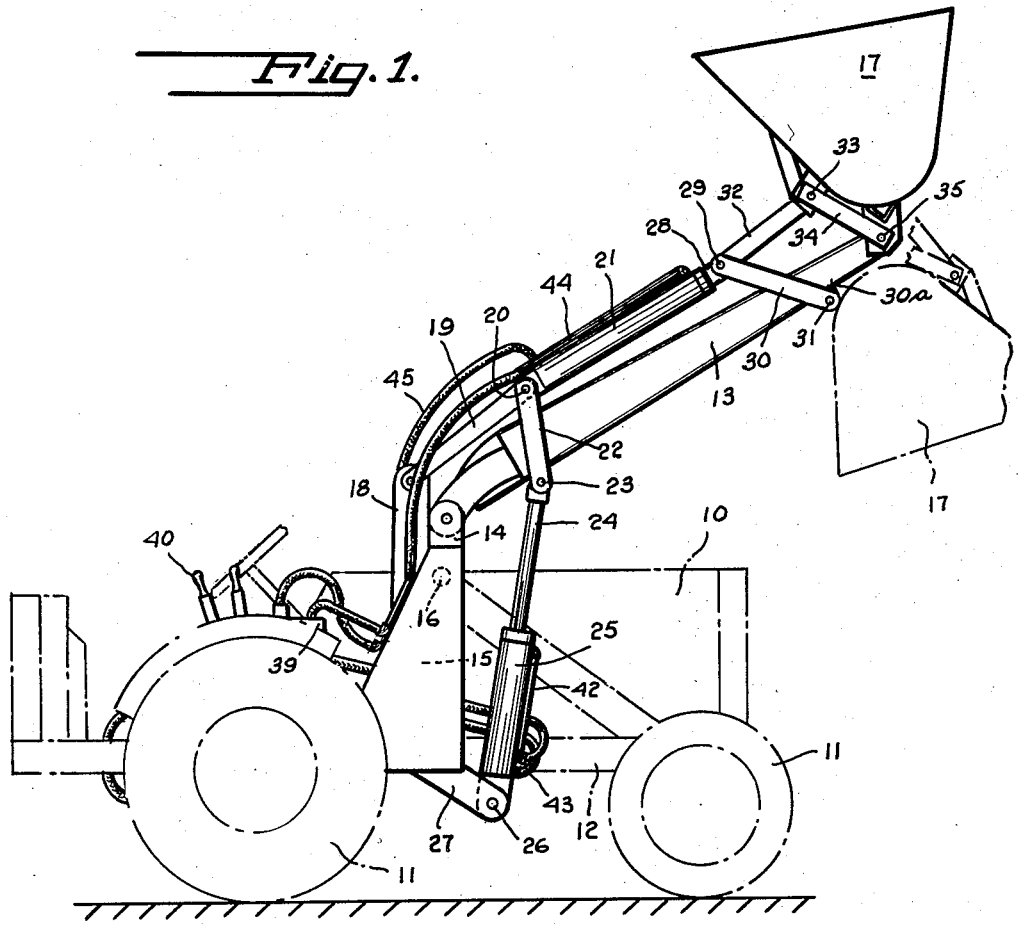
Fig. 1 is a side view of a tractor mounted loader embodying the invention.

Referring more particularly to the drawings wherein similar reference characters designate corresponding parts throughout the several views, the loader apparatus shown embodying the invention is mounted on a tractor having the engine 10, wheels 11 and frame 12.

The apparatus is entirely hydraulically operated with the hydraulic system actuated by a hydraulic pump 36 driven by the tractor engine.

The loader arrangement comprises a pair of loader push arms 13 which are pivotally mounted at one end to the upper end of upright support 14 which is secured to the tractor frame 12 and one of the uprights or supports 14 has the fluid reservoir 15 of the hydraulic system combined therewith or supported thereby and adapted to contain the supply of fluid for the hydraulic system which fluid can be open or covered by the cap 16.

On the forward or free ends of the push arms 13 is pivotally mounted the bucket 17.

Adjacent the uprights or supports 14 is positioned a second pair of uprights or supports 18, one on either side of the engine 10 and which supports 18 are connected to said tractor frame 12 and adjacent the upper ends of said supports 18 are pivotally connected the links 19 of the equalizing system for the bucket. Operating cylinders 21 form part of the equalizing system, and it is these cylinders with which this invention is principally concerned.

Ram 28 extends into cylinder 21 and is pivotally connected at 29 to a bucket actuating linkage system comprising link 30, which is pivotally connected at its opposite end to push arms 13 or an off-set portion 30a from said push arm which extends beneath said push arm and to which said link 30 is pivotally connected at 31.

Link 32 is pivotally connected at one end at 29 to ram 28 and is pivotally connected at its forward end at 33 to bucket 17. Link 34 is also pivotally connected to said link 32 and bucket 17 at pivot 33 and its opposite end is pivotally connected to push arm 13 at 35 adjacent the forward end of said push arm.

While only one push arm 13 and bucket support and equalizing system has been described, it will be understood that as shown, a complete similar system may be provided for each push arm.

Figure 2:
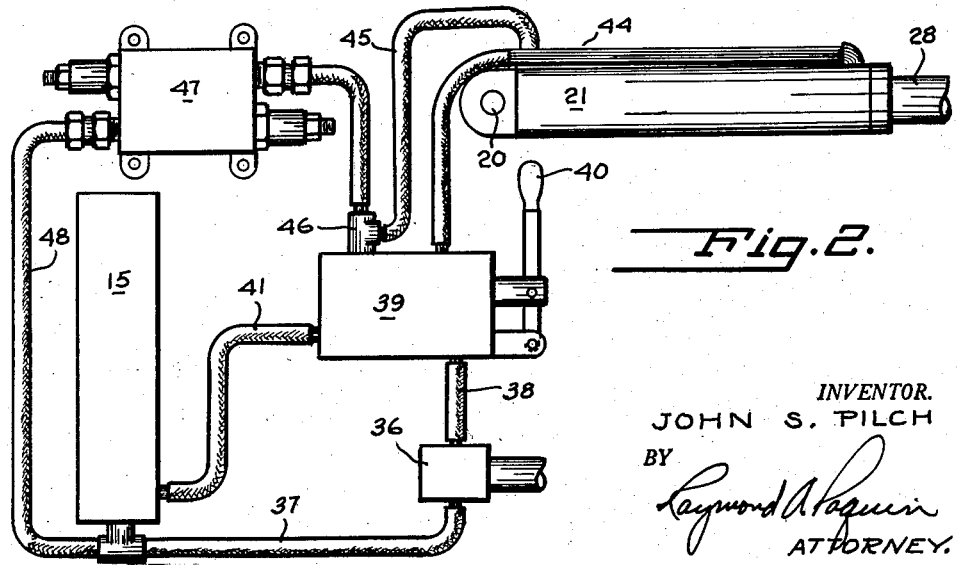
Fig. 2 is a schematic view of a portion of the loader hydraulic system.
Figure 3:
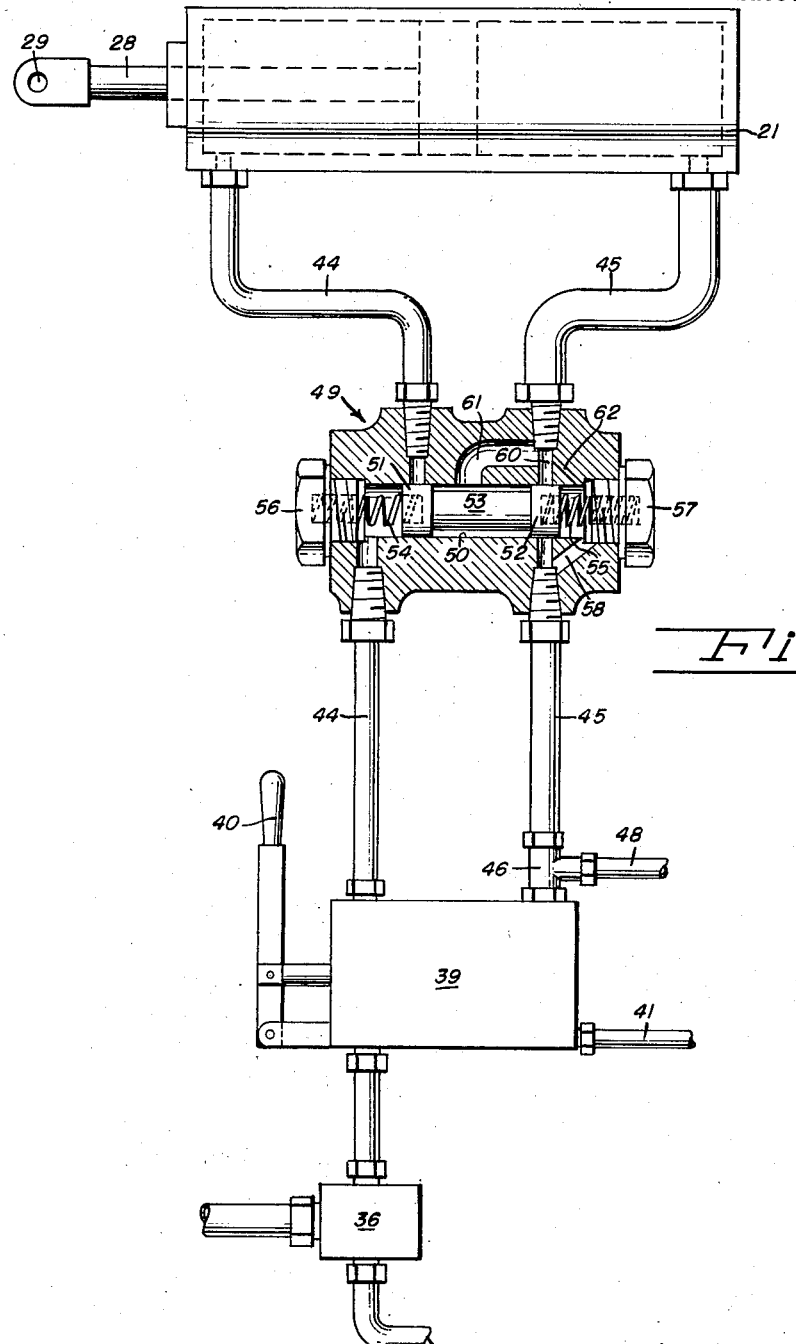
Fig. 3 is a diagrammatic view of the hydraulic circuit showing the installation of the quick dumping valve.

The hydraulic system for one hydraulic cylinder 21 is illustrated in Figs. 2 and 3 and comprises the tank 15 and pump 36 connected thereto by low pressure line 37 and the pump is connected by line 38 to control valve 39 adapted to be controlled by the operator through lever 40 and valve 39 is connected to tank 15 by a return line 41.

A combination pressure relief and vacuum relief valve 47 seen in Fig. 2 may be provided so that damage to the system will not result from excessive pressures in the hydraulic lines from, for instance, the bucket being struck against an immovable object, and so that upon excessive reduction in pressure in the system by fluid being forced out of the cylinder faster than the pump can replace it at the pressure side of the cylinder, fresh fluid will be drawn into the circuit and a vacuum in the system avoided.

Cylinders 25 and rams 24 operate to raise and lower push arms 13 and bucket 17 and cylinders 21 operate to pivot bucket 17 for loading and dumping. The hydraulic circuit for cylinders and rams 24, 25 is not shown.

It is pointed out that the linkage arrangement for rotating the bucket 17, as shown in Fig. 1, allows a much greater degree of bucket rotation while the operator maintains positive control of the bucket at all times and that with the link 30 pivotally connected to arm 13 or to the offset 30a under arm 13 that this arrangement allows much greater bucket rotation in both directions. As seen in the drawings, the link 30 is so designed as to allow pivoting of the bucket from loading position as shown in full lines in Fig. 1 around the end of the push arms 13 to full dump position as shown in broken lines in Fig. 1 without going over the center position and thereby allowing ample bucket rotation which is essential for dumping and, if desired, allows the hitting of the bucket against the lower side of the lift arms to knock material out of the bucket without the necessity of the arms reaching full height. Also, extension link 32, pivot link 30 and piston 28 are connected together by a single pin connection.

The links (pivot and extension) are so designed as to allow the force of the piston to follow substantially the arc of travel of the bucket in nearly a direct plane, thus providing a maximum degree of rotation of the bucket with a minimum amount of piston travel.

Due to the arrangement of this linkage maximum power is obtained with the bucket in digging position and the speed of rotation of the bucket is continuously increased as the bucket is rotated to dumping position.

Figure 8:
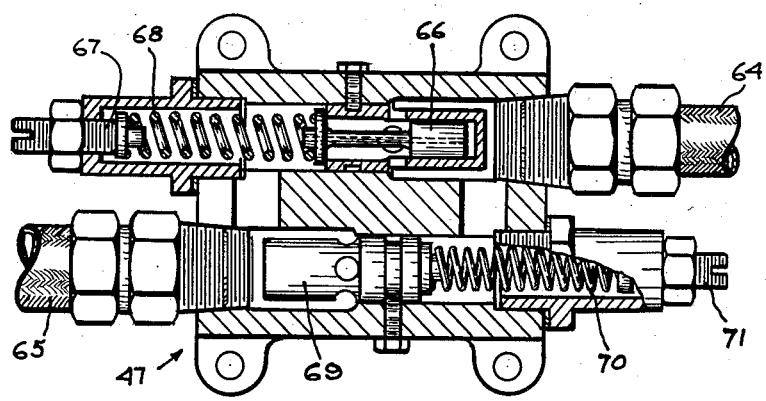
Fig. 8 is a sectional view of one form of combined relief and vacuum relief valves.
Figure 7:
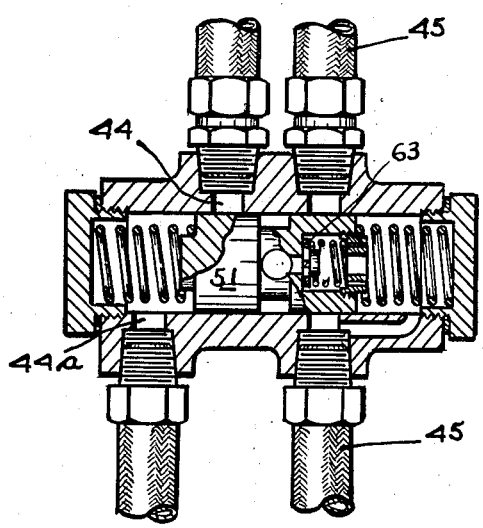
Fig. 7 is a sectional view of a modified form of the flow control or bypass valve.

The flow control or bypass valve arrangement shown in Figs. 7 through 9 is provided for the purpose of increasing the speed of tripping or dumping of the bucket and, therefore, considerably increasing the speed of loading with the device.

The object of this valve is to allow the diversion of the hydraulic fluid directly from line 44, when it is being used as the return line, to the line 45 when the bucket 17 is being rotated to dumping position, by opening lines 45 to pressure from pump 36, without the necessity of such fluid passing through control valve 39 to reach such pressure lines and thereby considerably speeding up the dumping of the bucket during dumping.

Figure 4:
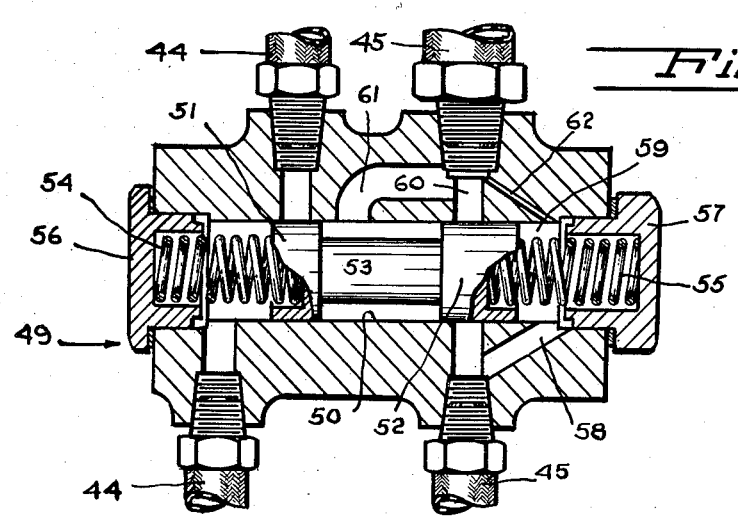
Figs. 4, 5 and 6 are sectional views of the flow control or bypass valve in its various positions.
Figure 5:
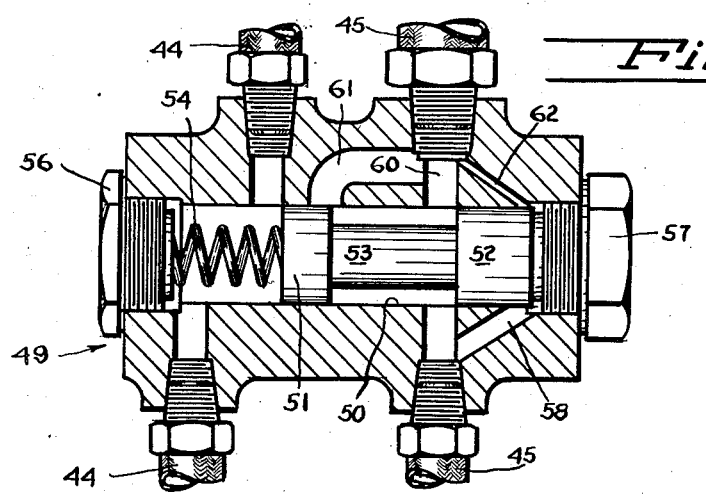
Figure 6:
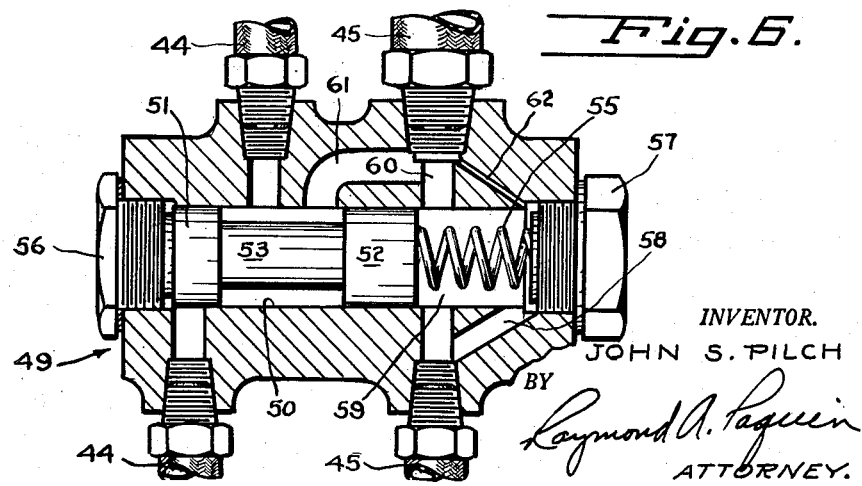

The valve 49 as shown in Figs. 4, 5 and 6, contains the bore 50 to which the lines 44 and 45 or 42 and 43 connect as the case may be, as a separate valve is provided for each set of the cylinders where the cylinders are operated in unison and interposed in the hydraulic lines thereof and in bore 50 is mounted the sliding valve comprising the land portions 51 and 52 connected by the reduced portion 53.

The normal position of said movable valve member is controlled by means of coil springs or other resilient means 54 and 55 bearing against the opposite ends of said sliding member and which valve may be positioned through the ends of said bore 50 which are closed by the caps 56 and 57.

The valve 49 is provided with two connections for line 45 these being shown as lying in a common plane, and with two connections for line 44, these being offset, that is, not lying in a common plane, the part of line 44 connected to the valve 39 being the connection closest to the end closure cap 56 of the valve bore 50. The connection accommodating the line 45 from the control valve 39 is provided with a passage 58 bypassing land 52 whereby when fluid under pressure reaches said valve through line 45 from the control valve said pressure will enter the space 59 beyond the end of land 52 and move said land to the position shown in Fig. 6 at which time fluid will pass through passage 60 to line 45 from control valve 39 and returning fluid from the cylinder will enter bore 50 through line 44 from the cylinder 21 around the reduced portion 53 of the sliding valve (see Fig. 6), and will pass from the bore 50 through passage 61 directly back into line 45 without passing through valve 39 and it will be seen that because of the off timing of the lands 51 and 52 that the land 51 will close off line 44 which would normally be the return line to the tank so that all of said fluid returning through line 44 will pass directly into line 45 through passage bore 61 and as the volume of the pump depends on the speed of the motor, that with the present construction it is possible to dump at high speed regardless of the speed of the motor.

It will be seen that by the closing off of line 44 when it serves as the return line the bypassing of fluid from the return to the pressure line begins and is effected from the beginning of the tipping of the bucket and is instantaneous from the beginning of the cycle without delay and, therefore, considerably speeds up the operation of dumping of the bucket.

The small bypass or bleed line 62 connecting line 45, between the valve and the cylinder 21, with chamber 59 is provided to bleed off chamber 59 to allow the spool or valve to reach shut-off position as shown in Fig. 4.

From the foregoing it will be seen that with the present construction that pressure line 45 is partially open, all of the fluid being returned through line 44 is bypassed thus assuring an open port with the slightest movement of the valve to connect said line 45 with the control valve, that is, fluid in the pressure line 45 effects immediate opening of the valve and effects immediate closing off of port 44, thus diverting all of the oil flow from line 44 directly to line 45.

From Fig. 3 it will be apparent that when the piston within cylinder 21 moves, say, one inch to the left, the volume within the cylinder to the right of the piston will increase in the amount of the area of the cross section of the cylinder times 1 cubic inch, whereas the volume within the cylinder to the left of the piston will decrease by the area of the section of the cylinder 21 less the area of the section of piston rod 28 times 1 cubic inch. Thus it will be seen that there is a displacement differential between the two ends of the cylinder.

Because of this displacement differential in the cylinder the fluid necessarily will go from line 44 to line 45 when both lines are connected to the pressure source and the action cannot be reversed.

In Fig. 7 is shown a valve arrangement generally similar to that of Figs. 4, 5 and 6 port 44a being offset from port 44 whereby said port 44a will be closed off by land 51 upon movement of the valve member to position whereby fluid may pass from the pump to line 45 and because said port 44a is shutoff, all fluid returned from the cylinder through line and port 44 is bypassed through a radial passage in the reduced portion of the sliding valve between lands 51 and 52 connecting with an axial passage through land 52 through a check valve 63 in the axial passage thereby increasing the efficiency of the bypass system.

From the foregoing, it will be seen that I have provided efficient and economical means for obtaining all of the objects and advantages of the invention.

I claim:

1. In a material handling device, a hydraulic system, a double acting cylinder, a combination pressure and return line connected to each end of said cylinder, a valve means for interposition in said pressure and return lines to each end of said double acting cylinder, said valve means comprising a body, a bore in said body, a slidable valve element in said bore, said valve element having two spaced lands connected by a portion providing a passage along said valve element between said lands, passages in said valve body to direct flow of hydraulic fluid into and out of said bore under the influence of said valve element, said passages intersecting said bore at such points that upon subjecting the first of said lines to pressure the second said line is opened directly through said valve to act as a return line and upon subjecting the second of said lines to pressure the portion of said first line between said valve means and said hydraulic cylinder is connected directly to said second line.

2. In a hydraulic system a double acting hydraulic cylinder and piston means having a piston rod extending from one side only of the piston whereby upon movement of the piston the volumetric change on the side of the piston remote from the piston rod is greater than on the side of the piston rod, a main control valve in said hydraulic system, a pair of hydraulic lines extending from said control valve to said hydraulic cylinder to selectively provide hydraulic fluid under pressure to one or other end of said cylinder and piston means, a bypass valve common to both said lines interposed in said lines between said control valve and said cylinder, said bypass valve being actuated by the actuation of the control valve to selectively supply hydraulic fluid to one or other end of said cylinder, said bypass valve comprising a body, a bore in said body, a spool shaped valve element slidable in said bore comprising a land at each end and a reduced portion therebetween, said lines from said control valve each communicating with said bore at an end thereof whereby pressure in one said line will move said valve element to open the corresponding line from said valve to said cylinder, resilient means to normally hold said valve element in mid position in said bore, said lines from said bypass valve to said cylinders each including a passage in the wall of the bore so located as to align with, and be closed by, said valve element when in said mid position, the hydraulic line from said main control valve to provide hydraulic fluid to the end of said cylinder remote from said piston rod being provided with a second connection to said bore lying in the plane of the passage connecting with the end of the cylinder remote from said piston rod, and a passage from said last mentioned passage to intersect said bore adjacent the passage from said bore to said piston rod end of said cylinder, whereby upon operating the control valve to provide fluid under pressure to the cylinder end remote from said piston rod, the hydraulic line from said return valve to said piston rod end of said cylinder will be connected to the line from said return valve to said end of said cylinder remote from said piston rod.

3. A bypass valve for interposition between a main control valve and a double acting cylinder and piston device in a hydraulic system operating such a double acting cylinder and piston device and having a hydraulic line to each end of said cylinder to act alternatively as pressure and as return lines, said valve comprising a valve body, a bore in said body, a valve element slidable in said bore having a land portion at each end and a passage forming portion between said lands, means in said bore to normally hold said valve element in mid position in said bore, a connection at each end of said bore from the main control valve whereby pressure in either connection will selectively move said valve element, a pair of connections for attachment of hydraulic lines from said valve to each end of said cylinder, said last named connection being normally closed by said land portions of said valve element, one of said last named connections being connected by a branch passage to said bore adjacent the other of said last named connections opposite said passage forming portion of said valve element, a passage normally closed by the same land that normally closes said one-of-said-last-named-connections connecting also to the adjacent hydraulic line from the said control valve.

4. A bypass valve for use in a hydraulic system operating a double acting cylinder and piston device and having a hydraulic line to each end of said cylinder to act alternatively as pressure and return lines, said bypass valve comprising a valve body, a bore in said body, a valve element slidable in said bore having a land portion at each end and a passage forming portion between said lands, means in said bore to normally hold said valve element in mid position in said bore, a pair of connections including passages into said bore at each end of said bore each said pair including one connection for a hydraulic line from a source of hydraulic fluid under pressure and another for connection to an end of said double acting cylinder, each of said one connections to an end of said cylinder of each pair being normally closed by one of said lands, one of said pairs of connections having its connection to a source of hydraulic fluid under pressure entering said bore only at its end, the other of said pairs of connections having a bypass connection from its one connection to an end of said cylinder to a point opposite the passage forming portion of said valve element, and having its connection to said source of hydraulic fluid under pressure positioned in the same plane as the corresponding one connection to said double acting cylinder and provided with a bypass passage to the end of said bore.

5. In a hydraulic system, a double acting cylinder, a main control valve, a hydraulic pressure and return line from said control valve to each end of said double acting cylinder, a bypass valve common to both said hydraulic lines and forming a part of each of said hydraulic lines, said bypass valve comprising a valve body having a bore intersected by both said hydraulic lines, a first of said hydraulic lines entering said bore at one end thereof and leaving said bore at a point spaced from said end, the second of said lines entering said bore at a point spaced from the other end of said bore and having a bypass passage leading to the end of said bore, and leaving said bore at a point in the same plane as the line entering said bore, a sliding valve element in said bore, means to normally retain said valve in median position, said valve comprising two land portions at its ends which, in said median position, close said lines leaving said bore, and a central passage forming portion bridging the space between said lands, said valve body being also provided with a bypass passage from said bore between said lines leaving said bore, said bypass being connected to said second of the lines leaving said bore.

6. A bypass valve to automatically regulate the return flow of hydraulic fluid from a double acting hydraulic cylinder and piston means comprising, a valve body, a bore through said body, a first path of flow through said valve including a first inlet and a first outlet passage spaced from one end of said bore and lying in a common plane, a second path of flow through said valve including a second inlet and a second outlet passage, said second inlet passage entering said bore at the end of said bore remote from said first inlet passage, and said second outlet passage being spaced from said second inlet passage along said bore, a slidable valve element comprising two land portions connected by a portion of reduced diameter, means to bias said valve element to a normal position at which said land portions close said outlet passages, a bypass from said first inlet passage to the adjacent end of said bore, and a bypass means by which said second outlet passage is connected to said first path of flow through said valve bore.

References Cited in the file of this patent

UNITED STATES PATENTS

| | | |
|---|---|---|
| 1,897,468 | Ellis | Feb. 14, 1933 |
| 2,376,519 | Stacy | May 22, 1945 |
| 2,379,180 | Pohl | June 26, 1945 |
| 2,463,803 | Pilch | Mar. 8, 1949 |
| 2,482,612 | Drott et al. | Sept. 20, 1949 |
| 2,590,454 | Pilch | Mar. 25, 1952 |
| 2,628,731 | Reuter | Feb. 17, 1953 |
| 2,646,025 | Deardorff | July 21, 1953 |
| 2,680,491 | Davidson | June 8, 1954 |
| 2,694,384 | Evans | Nov. 16, 1954 |
| 2,735,342 | Glaser | Feb. 21, 1956 |

FOREIGN PATENTS

| | | |
|---|---|---|
| 695,462 | Germany | Aug. 26, 1940 |